United States Patent [19]

Yamada et al.

[11] Patent Number: 4,568,143
[45] Date of Patent: Feb. 4, 1986

[54] OPTICAL FIBER CROSSOVER SWITCHING APPARATUS

[75] Inventors: Akira Yamada; Takao Ito, both of Yokohama, Japan

[73] Assignee: Tokyo Shibaura Denki Kabushiki Kaisha, Kawasaki, Japan

[21] Appl. No.: 375,016

[22] Filed: May 5, 1982

[30] Foreign Application Priority Data

May 13, 1981 [JP] Japan ................. 56-70685

[51] Int. Cl.$^4$ ............. G02B 5/17; G02B 7/26
[52] U.S. Cl. ................ 350/96.20; 350/96.15
[58] Field of Search .......... 350/96.15, 96.20, 96.21

[56] References Cited

U.S. PATENT DOCUMENTS 4,124,271 11/1978 Green .................. 350/96.20

FOREIGN PATENT DOCUMENTS

| 48867 | 4/1982 | European Pat. Off. ....... 350/96.20 |
| 3012450 | 10/1981 | Fed. Rep. of Germany . |
| 2331801 | 6/1977 | France . |
| 2479993 | 10/1981 | France . |
| 13349 | 1/1979 | Japan . |
| 27103 | 3/1981 | Japan . |
| 1559615 | 1/1980 | United Kingdom . |

OTHER PUBLICATIONS

Burke et al., *IBM Technical Disclosure Bulletin*, vol. 18, No. 2, Jul. 1975, "Fiber Optic Repeater Bypass Switch", pp. 481–482.

*Primary Examiner*—William L. Sikes
*Assistant Examiner*—Frank González
*Attorney, Agent, or Firm*—Oblon, Fisher, Spivak, McClelland & Maier

[57] ABSTRACT

An optical switching apparatus comprises a stationary block and a movable block. The stationary block abuts on one face of the movable block. The stationary block holds a first and a second input optical fiber and a first and a second output optical fiber. The movable block holds four coupling optical fibers each at both end portions, each coupling optical fiber being an open loop. The movable block may move from a first position to a second position, or vice versa. As long as the movable block stays in the first position, both end faces of the first coupling optical fiber face one end face of the first input optical fiber and one end face of the first output optical fiber, respectively, and both end faces of the second coupling optical fiber face one end face of the second input fiber and one end face of the second output optical fiber, respectively. When the movable block is moved in the second position, both end faces of the third coupling optical fiber face one end face of the first input optical fiber and one end face of the second output optical fiber, respectively, and both end faces of the fourth coupling optical fiber face one end face of the second input optical fiber and one end of the first output optical fiber, respectively.

11 Claims, 9 Drawing Figures

OPTICAL FIBER CROSSOVER SWITCHING APPARATUS

BACKGROUND OF THE INVENTION

This invention relates to an optical switching apparatus for switching optical waveguides, from one to another.

A variety of optical communication systems have been developed. Optical switching apparatus of various types have been invented, which may be used in the optical communication systems.

An optical switching apparatus is disclosed in, for example, Japanese Patent Disclosure No. 56-27103 and U.S. patent application Ser. No. 65,667 (now abandoned) which corresponds to the Japanese patent disclosure and which was filed on Aug. 1, 1979 by E. J. Rawson. The optical switching apparatus comprises a pair of input optical fibers and a pair of output optical fibers. The output fibers are fixed to a stationary block, and the input fibers are fixed to a movable block. As long as the movable block stays in a first position, the input fibers are optically connected to the output fibers, respectively. When the movable block is moved to a second position, only one of the input fibers is optically coupled to one of the output fibers. The apparatus is designed for used in only one specific optical communication system. It cannot work if incorporated into other optical communication systems. It can change only two-input/two-output state to one-input/one-output state, or vice versa.

An optical switching apparatus which may be used in optical communication systems of different types is disclosed in Japanese Patent Disclosure No. 54-13349. The apparatus comprises a first input optical fiber and a second input optical fiber both fixed to a first stationary block. It further comprises a first output optical fiber and a second output optical fiber both fixed to a second stationary block. Between the stationary blocks a movable block is so disposed that a first gap is provided between the first stationary block and the movable block and a second gap is provided between the second stationary block and the movable block. The movable block holds four coupling optical fibers.

As long as the movable block lies in a first position, one end face of the first input fiber faces one end face of the first coupling fiber through the first gap, and the other end face of the first coupling fiber faces one end face of the first output fiber through the second gap. Similarly, in this state, one end face of the second input fiber faces one end face of the second coupling fiber through the first gap, and the other end face of the second coupling fiber faces one end face of the second output fiber. Therefore, an optical signal supplied through the first input fiber is transmitted to the first output fiber and an optical signal supplied through the second input fiber is transmitted to the second output fiber through the second coupling fiber.

When the movable block moves to a second position, the end face of the first input fiber comes to face one end face of the third coupling fiber through the first gap, and the other end face of the third coupling fiber comes to face the end face of the second output fiber through the second gap. At the same time, the end face of the second input fiber comes to face one end face of the fourth coupling fiber through the first gap, and the other end face of the fourth coupling fiber comes to face the end face of the first output fiber through the second gap. Therefore, as long as the movable block stays in the second position, an optical signal supplied through the first input fiber is transmitted to the second output fiber through the third coupling fiber and an optical signal supplied through the second input fiber is transmitted to the first output fiber through the fourth coupling fiber.

The optical switching apparatus disclosed in the Patent Disclosure No. 54-13349 is manufactured in the following manner.

First, four optical fibers are adhered on a rectangular flat plate and arranged thereon in a specific manner. On one end portion of the plate the first and third optical fibers extend straight and parallel and lie close to each other. On the same end portion the second and fourth fibers extend straight and parallel and lie close to each other. On the intermediate portion of the plate the third fiber curves, intersecting first with the first fiber which is straight. On the intermediate portion of the plate the fourth fiber curves, intersecting first with the third fiber at about the center of the plate and then with the first fiber. On the other end portion of the plate the first fiber and the fourth fiber extend straight and parallel and lie close to each other, and the second and third fibers extend straight and parallel and lie close to each other. The rectangular plate with the four fibers is then cut into three rectangular blocks, a first stationary block, a movable block and a second stationary block. The edge of each block is polished and cleaned. This done, the first and second stationary blocks are fixed to a base, spaced from each other. The movable block is laid on the base and between the first and second stationary blocks, with a first gap between it and the first stationay block and a second gap between it and the second stationay block. Thus is completed the optical switching apparatus disclosed in Japanese Patent Disclosure No. 54-13349.

The optical switching apparatus of Patent Disclosure No. 54-13349, however, is disadvantageous in the following respects:

(1) The rectangular flat plate must be cut twice, thereby to provide three blocks. Four parallel edges of the blocks thus provided must be polished. Much time is necessary to cut the plate into three blocks and to polish each block, inevitably raising the cost of the apparatus. In addition, technical difficulties envolve in polishing the four edges of the blocks truly flat and truly parallel to one another.

(2) The coupling fibers intersect at three points. Therefore, the coupling fibers may be cut in the manufacturing process. To avoid such a problem, the apparatus has to be large.

(3) The gaps between the blocks must be extremely uniform. It is therefore time-consuming to arrange the three blocks to provide such uniform gaps. This would raise the cost of the apparatus. Unless extremely uniform gaps are provided, a great power loss will be unavoidable.

(4) Either gap, i.e. the distance between the movable block and either stationary block, may change as the ambient temperature rises and falls. Provided with two gaps, the apparatus has worse temperature characteristics.

(5) The optical fibers are longitudinaly arranged. The switching apparatus may be relatively large.

SUMMARY OF THE INVENTION

It is an object of the invention to provide an optical switching apparatus which is small and which has a simple structure.

Another object of the invention is to provide an optical switching apparatus which has a small power loss and which is easy to manufacture.

According to the invention there is provided an optical switching apparatus comprising a first input optical fiber having a first end face and a second end face, said first end face being so positioned as to receive an optical input signal; a first and a second output optical fiber each having a first end face and a second end face, the first end face of each output optical fiber being so positioned as to deliver an optical output signal; a stationary block holding the first input optical fiber and the first and second output optical fibers and having a face which lies flush with the second end faces of the input and output optical fibers; a first and a second coupling optical fiber each having a first end face and a second end face and being adapted to transmit an optical signal; and a movable block holding the first and second coupling optical fibers, having a face which lies flush with the first and second end faces of the first and second coupling optical fibers, and being movable between a first position and a second position, so that the second end face of the first input optical fiber and the second end face of the first output optical fiber face the first and second end faces of the first coupling optical fiber, respectively when said movable block lies in the first position and that the second end face of the first input optical fiber and the second end face of the second output optical fiber face the first and second end faces of the second coupling optical fiber, respectively when said movable block lies in the second position.

DETAILED DESCRIPTION OF THE PREFERRED EMBODIMENT

Figure 1:
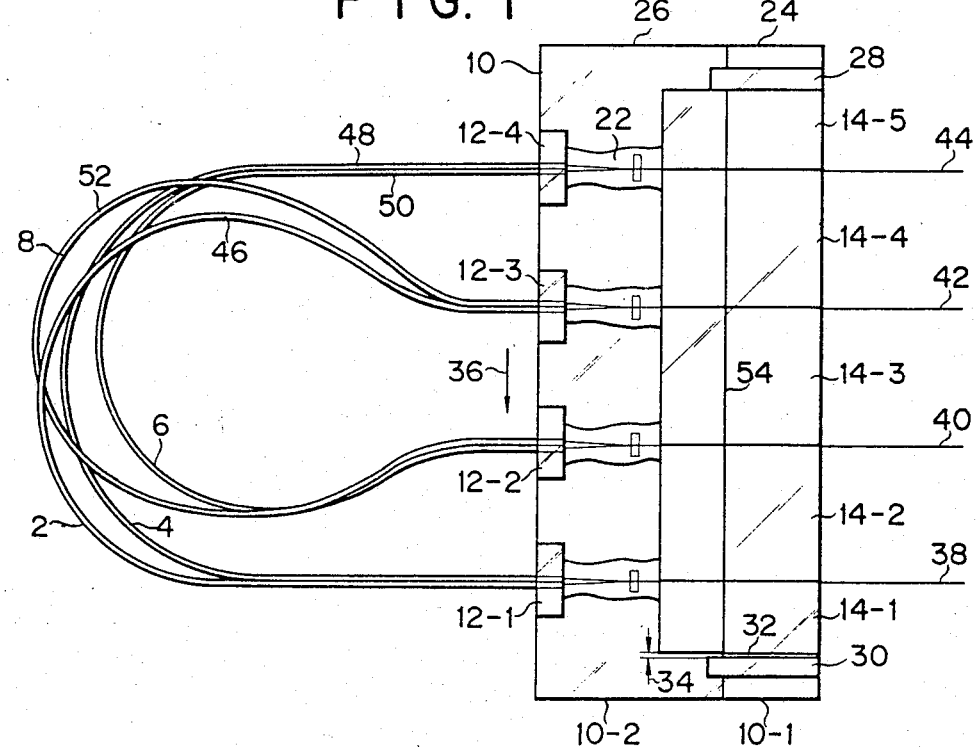
FIG. 1 is a plan view of an optical switching unit, an embodiment of the present invention.

FIG. 1 shows an optical switching unit, main part of an optical switching apparatus according to the present invention. The optical switching unit is manufactured in the following manner.

First, four optical fibers 2, 4, 6 and 8 are prepared. As well known, an optical fiber consists of a core and a cladding covering the core. The commercially available optical fiber is somewhat different. It consists of a core, a cladding covering the core, a primary coat of silicon resin covering the cladding and a jacket of nylon covering the primary coat. The four fibers 2, 4, 6 and 8 are commercially available ones. The jacket and primary coat are removed from both end portions of each fiber. Thus, the cladding of the fiber 2 is therefore exposed at both end portions 2-1 and 2-2. So is the cladding of the fiber 4 at both end portions 4-1 and 4-2. Likewise, the cladding of the fiber 6 is naked at both end portions 6-1 and 6-2, and the cladding of the fiber 8 is naked at both end portions 8-1 and 8-2.

Figure 2:
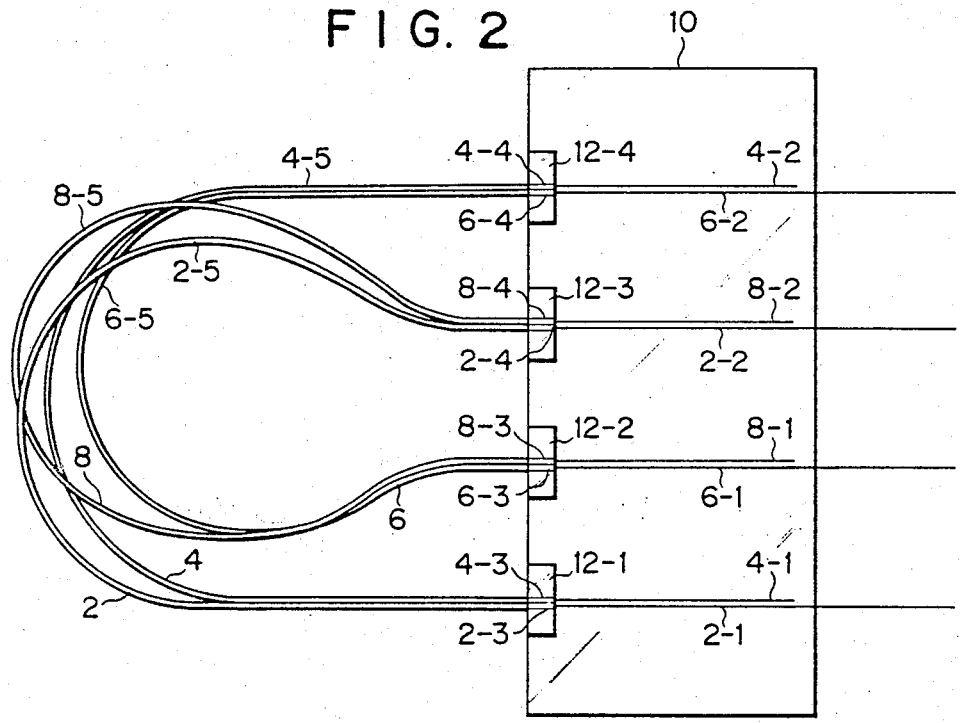
FIGS. 2 and 3 are plan views of the optical switching unit shown in FIG. 1, both illustrating how the unit is manufactured.

Then, as illustrated in FIG. 2, one jacketed end portion 2-3 of the fiber 2 and one jacketed end portion 4-3 of the fiber 4 are fixed by a first glass piece 12-1 onto a rectangular based glass plate 10, and extend parallel and lie close to each other. One naked end portion 2-1 of the fiber 2 and one naked end portion 4-1 of the fiber 4, which are continuous respectively to the jacketed end portions 2-3 and 4-3, lie close to each other also on the base glass plate 10 and extend parallel to each other. Similarly, one jacketed end portion 6-3 of the fiber 6 and one jacketed end portion 8-3 of the fiber 8 are fixed by a second glass piece 12-2 onto the base glass plate 10, and extend parallel and lie close to each other. One naked end portion 6-1 of the fiber 6 and one naked end portion 8-1 of the fiber 8, which are continuous respectively to the jacketed end portions 6-3 and 8-3, lie close to each other also on the base glass plate 10 and extend parallel to each other.

The jacketed intermediate portions 2-5, 4-5, 6-5 and 8-5 of the fibers 2, 4, 6 and 8 are curved, thus forming four open loops outside the base glass plate 10. The other jacketed end portion 2-4 of the fiber 2 and the other jacketed end portion 8-4 of the fiber 8 are fixed by a third glass piece 12-3 onto the base glass plate 10, and extend parallel and lie close to each other. The other naked end portion 2-2 of the fiber 2 and the other naked end portion 8-2 of the fiber 8, which are continuous respectively to the jacketed end portions 2-4 and 8-4, lie close to each other also on the base glass plate 10 and extend parallel to each other. Similarly, the other jacketed end portion 4-4 of the fiber 4 and the other jacketed end portion 6-4 of the fiber 6 are fixed by a fourth glass piece 12-4 onto the base glass plate 10, and extend parallel and lie close to each other. The other naked end portion 4-2 of the fiber 4 and the other naked end portion 6-2 of the fiber 6, which are continuous respectively to the jacketed end portions 4-4 and 6-4, lie close to each other also on the base glass plate 10 and extend parallel to each other.

As shown in FIG. 2, both naked end portions 2-1 and 2-2 of the fiber 2 and both naked end portions 6-1 and 6-2 of the fiber 6 extend beyond the base glass plate 10. The naked end portion 2-1 of the fiber 2 lies below the naked end portion 4-1 of the fiber 4, as viewed in FIG. 2, and the other naked end portion 2-2 of the fiber 2 lies below the naked end portion 8-2 of the fiber 8. The naked end portion 6-1 of the fiber 6 lies below the naked end portion 8-1 of the fiber 8. as viewed in FIG. 2, and the other naked end portion 6-2 lies below the naked end portion 4-2 of the fiber 4. This particular positional relation of the naked end portions of the four fibers 2, 4, 6 and 8 is necessary. Unless the naked end portions of the fibers 2, 4, 6 and 8 are so positioned, an optical switching apparatus using the optical switching unit will fail to operate correctly.

Figure 4:
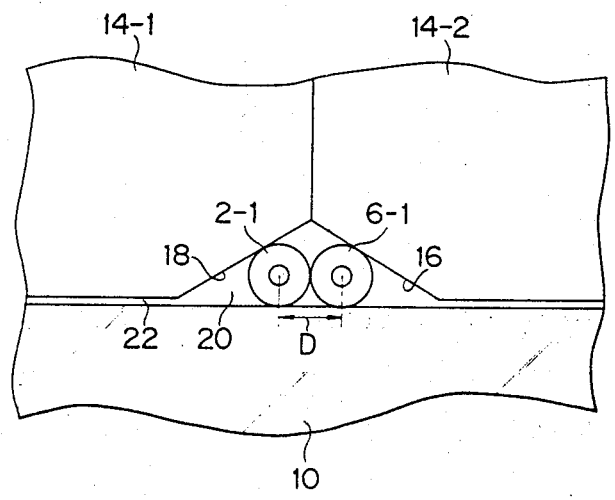
FIG. 4 is a front view of the optical switching unit shown in FIG. 1, showing a portion of the front surface of the unit.

After the optical fibers 2, 4, 6 and 8 have been so arranged as illustrated in FIG. 2, their naked end portions 2-1, 2-2, 4-1, 4-2, 6-1, 6-2, 8-1 and 8-2 are immovably held on the base glass plate 10 by glass plates 14-1, 14-2, 14-3, 14-4 and 14-5. These glass plates 14-1 to 14-5 are arranged on the base glass plate 10 side by side with no gap between them. As shown in FIG. 4, the abutting edges of any adjacent glass plates have each a slant face. More specifically, the glass plates 14-1 and 14-2, for example, have slant faces 18 and 16, respectively. The slant faces 16 and 18 and the upper surface of the base glass plate 10 define a prism-shaped space 20. The glass plates 14-1 to 14-5 are adhered to the base glass 10 with an adhesive 22, thus providing four prism-shaped spaces 20. Within the space 20 defined by the glass plates 10, 14-1 and 14-2 the naked end portions 2-1 and 4-1 extend parallel to each other. Likewise, the naked end portions 6-1, and 8-1 extends parallel through the space 20 defined by the glass plates 10, 14-2 and 14-3. So do extend the naked end portions 2-2 and 8-2 through the prism-shaped space 20 defined by the glass plates 10, 14-3 and 14-4. The naked end portions 4-2 and 6-2 extend parallel through the prism-shaped space 20 defined by the glass plates 10, 14-4 and 14-5. All the naked end portions of the optical fibers 2, 4, 6 and 8 are bonded to the base plate 10 with adhesive 22, too.

Figure 3:
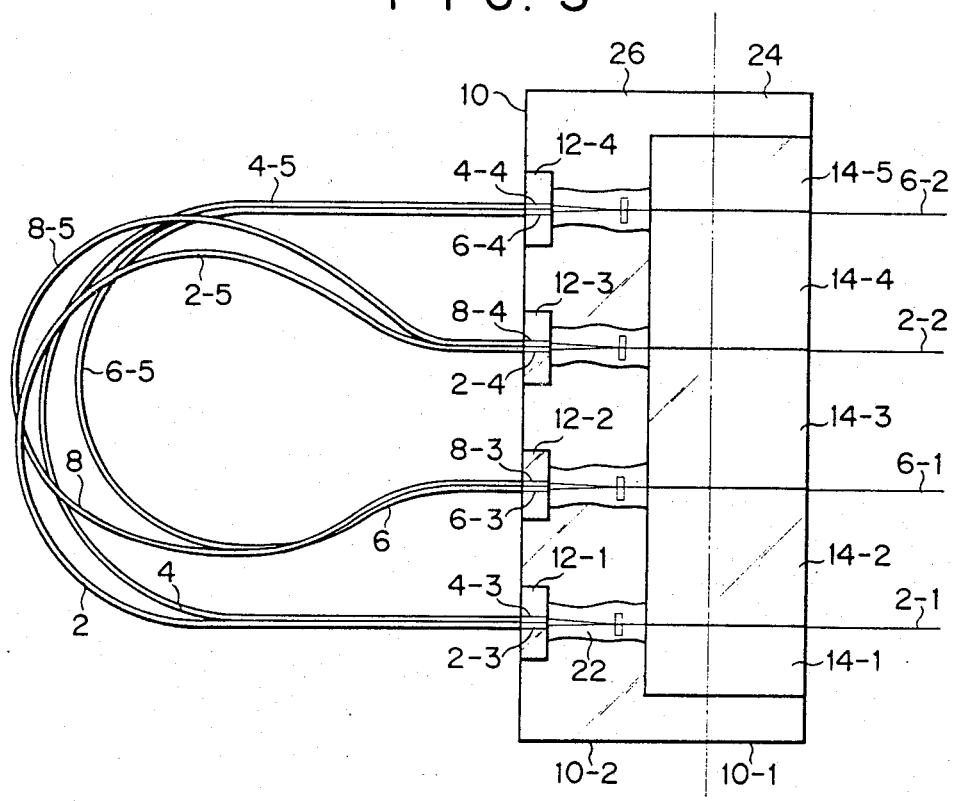

Thereafter, the base glass plate 10 and the glass plates 14-1 to 14-5, which hold the naked end portions 2-1, 2-2, 4-1, 4-2, 6-1, 6-2, 8-1 and 8-2, are cut along a chain line as illustrated in FIG. 3. As a result, the optical fibers 2, 4, 6 and 8 are cut into two groups as illustrated in FIG. 1. One group consists of two input fibers 38 and 40 and two output fibers 42 and 44. The other group consists of four coupling fibers 46, 48, 50 and 52. At the same time, the block consisting of the base glass plate 10 and the glass plates 14-1 to 14-5 is divided into two blocks 24 and 26 as shown in FIGS. 1 and 3. The abutting edges of the blocks 24 and 26 are polished, thus providing two optically polished faces, one of which is illustrated in FIG. 4.

As shown in FIG. 4, any two adjacent naked end portions of the fibers contact each other. The distance between their axes is therefore equal to the outer diameter D of the cladding of either optical fiber.

The blocks 24 and 26 are then put together, with their polished faces put in contact in such way that the naked end portion of any fiber attached to the block 24 is coaxially aligned with the naked end portion of the corresponding fiber attached to the block 26. A stopper 28 is then adhered to one half 10-1 of the base plate 10, which is a part of the block 24, and is positioned in contact with both halves of the glass plate 14-5 as shown in FIG. 1. As illustrated also in FIG. 1, another stopper 30 is adhered to said half 10-1 of the base glass plate 10 and a spacer 32 having width D is positioned between the another stopper 30 and the side of front half of the glass plate 14-1. Therefore, there is provided a gap 34 which is equal to the outer diameter D of the claddings of the optical fibers between the side of rear half of the glass plate 14-1 and the another stopper. Thus, at last such an optical switching unit as shown in FIG. 1 is manufactured.

In the above-mentioned method of manufacturing an optical switch unit, both stoppers 28 and 30 are secured to one of the halves of the base plate, i.e. the half 10-1. Instead, both stoppers 28 and 30 may be fixed to the other half of the base plate 10.

The block 24 of the optical switching unit is fixed to a base frame, which will later be described. The block 26 is movably mounted on the base frame. Hence, the block 24 is a stationary block and the block 26 is a movable block. The movable block 26 may be moved for a distance D (i.e. the outer diameter of the cladding) in the direction of arrow 36 in FIG. 1, with its optically polished face put in contact with, or spaced a little from, the optically polished face of the stationary block 24. When the movable block 26 is so moved, from a first position to a second position, the optical switching unit performs its function, as will be described with reference to FIGS. 5A and 5B.

Figure 5A:
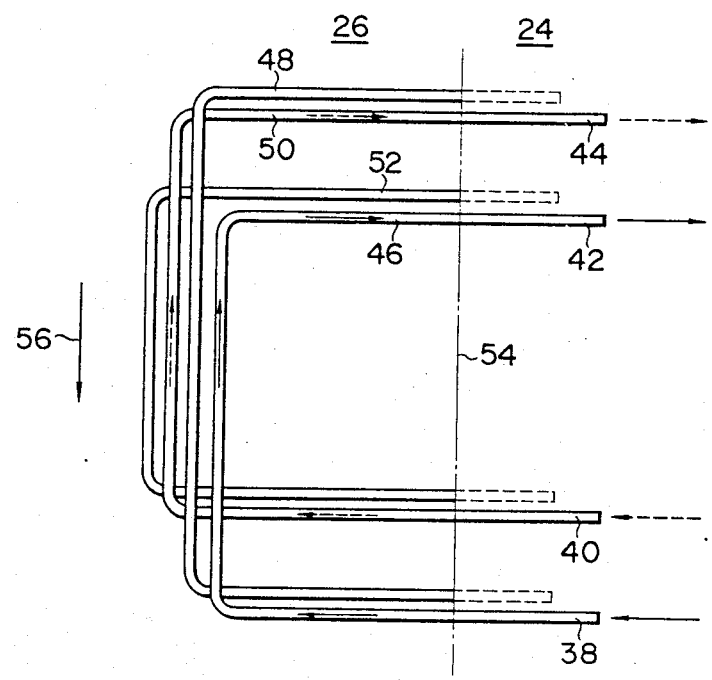
FIGS. 5A and 5B illustrate how the optical switching unit of FIG. 1 performs a switching operation.

As FIG. 5A schematically shows, as long as the optical switching unit stays in the first position, the first input optical fiber 38 has its end face put in face-to-face relation with one end face of the first coupling fiber 46. A gap 54 is provided between these end faces of the fibers 38 and 46. Thus, the first input fiber 38 is optically connected to the first coupling fiber 46. The other end face of the first coupling fiber 46 faces one end face of the first output optical fiber 42. The first output fiber 42 is therefore optically connected to the first coupling fiber 46 through the gap 54. Similarly, one end face of the second input optical fiber 40 faces one end face of the third coupling optical fiber 50. The fibers 40 and 50 are thus optically connected through the gap 54. Further, the other end face of the third coupling fiber 50 faces one end face of the second output optical fiber 44. The fibers 44 and 50 are therefore optically connected through the gap 54. Accordingly, as long as the movable block 26 remains in the first position as shown in FIG. 5A, a first optical signal supplied through the first input fiber 38 is supplied to the first output fiber 42 through the first coupling fiber 46, and a second optical signal supplied through the second input fiber 40 is supplied to the second output fiber 44 through the third coupling fiber 50.

Figure 5B:
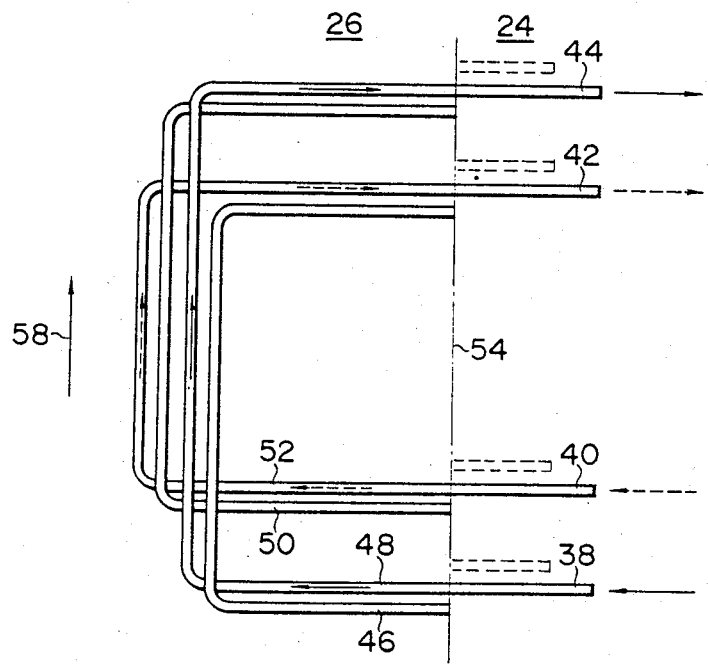

When the movable block 26 is moved in the direction of arrow 56 for a distance D and is thus brought to the second position, the connection of the optical fibers is changed. That is, as shown in FIG. 5B, once the movable block 26 hs been moved to the second position, the first input fiber 38 is optically coupled to the second output fiber 44 through the second coupling fiber 48 and the second input fiber 40 is optically connected to the first output fiber 42 through the fourth coupling fiber 52. Accordingly, as long as the movable block 26 stays in the second position, the first optical signal is supplied to the second output fiber 44 and the second optical signal is supplied to the first output fiber 42. The movable block 26 may be moved from the second position back to the first position, the direction of arrow 58 in FIG. 5B.

As described above, the first and second optical signals are supplied respectively to the first and second output fibers 42 and 44 while the movable block 26 lies in the first position. The first and second optical signals are supplied to the second output fiber 44 and the first output fiber 42, respectively, while the movable block 26 stays in the second position.

Figure 6:
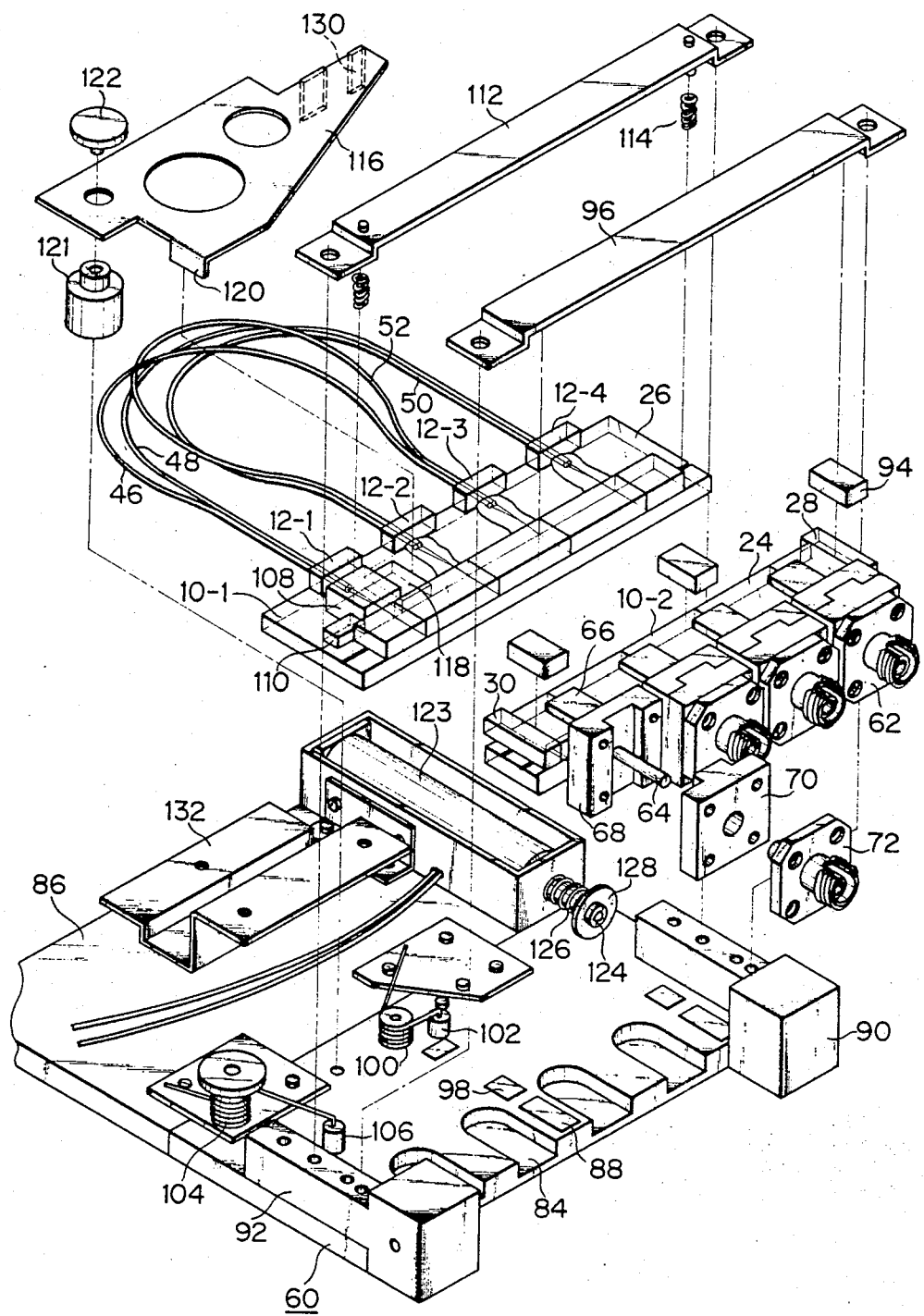
FIG. 6 is an exploded view of an optical switching apparatus according to the invention, which uses the optical switching unit shown in FIG. 1.

In order to perform the above-mentioned switching operation the optical switching unit of FIG. 1 is attached to such a base plate 60 as shown in FIG. 6. A receptacle unit 62 is secured to the stationary block 24 before the block 24 is fixed to the base plate 60. It is desired that the receptacle unit 62 be secured to the base plate 10 and the glass plates 14-1 before these plates are cut into two pieces each. If fixed to the plates 10 and 14-1 before these plates are so cut, the receptacle unit 62 would help prevent the optical fibers from being broken when the plates 10 and the plates 14-1 to 14-5 are cut or when the abutting edges of the resulting two blocks are optically polished.

Those naked portions of the fibers 38, 40, 42 and 44 which extend outside the stationary block 24 are guided by such ferrules 64 as shown in FIG. 6. Those portions of the fibers 38, 40, 42 and 44 which are projecting from the ferrules 64 are cut away, and the end faces of the fibers 38, 40, 42 and 44 are polished to make optically polished faces, which are each flush with the distal end face of the corresponding ferrule 64. The ferrules 64 have their proximal ends adhered to the base glass plate 10. More precisely, the four ferrules 64 are held respectively in such four prism-shaped spaces 20 as illustrated in FIG. 4, which are provided in the stationary block 24. The base portion of each ferrule 64 is inserted in a through hole of a receptacle mount 68 having a pair of tongues 66. The tongues 66 of each receptacle mount 68 sandwich the base glass plate 10 and two adjacent glass plates 14-1, 14-2, all glass plates belonging to the stationary block 24. The tongues 66 of each ferrule 64 are adhered to the base glass plate 10 and two adjacent glass plates. To each receptacle mount 68 a receptacle spacer 70 is fitted. The spacer 70 has a through hole, through which the ferrule 64 extends. Each spacer 70 contacts a receptacle 72 which has four through holes at four corners, respectively. Four screws (not shown) is inserted into the four holes of each receptacle 72 and four holes made similarly in the spacer 70 and screwed into four threaded holes made in the receptacle mount 68. Hence, each receptacle 72 is fixed to the corresponding receptacle mount 68 with the spacer 70 disposed between it and the mount 68.

Figure 7:
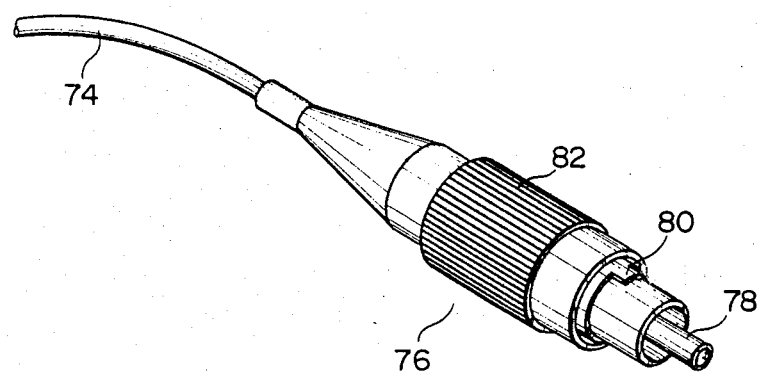
FIG. 7 is a perspective view of an optical connector which may be attached to the optical switching apparatus shown in FIG. 6.

To each of the four receptacles 72 such a connector 76 as illustrated in FIG. 7 is detachably connected. The connector 76 comprises a ferrule 78, a hollow cylinder having a projection 80, and a hollow cylinder 82. The ferrule 78 and the two hollow cylinders are coaxial. The projection 80 is to determine the angular position of the connector with respect to the receptacle 72. The hollow cylinder 82 can be moved in the axial direction of the connector 76. After the ferrule 78 has been inserted into the receptacle 70, the cylinder 82 is turned until it comes into screw engagement with the receptacle 70. Thus, the connector 76 is attached to the receptacle 70. Three other connectors (not shown) of the same structure are attached to the other three receptacles 70 in the same way.

After the four receptacle units 62 have been secured to the base glass plate 10 and the glass plates 14-1 to 14-5, the glass plates 10 and 14-1 to 14-5 are cut into two pieces each, thus providing two blocks 24 and 26.

Figure 8:
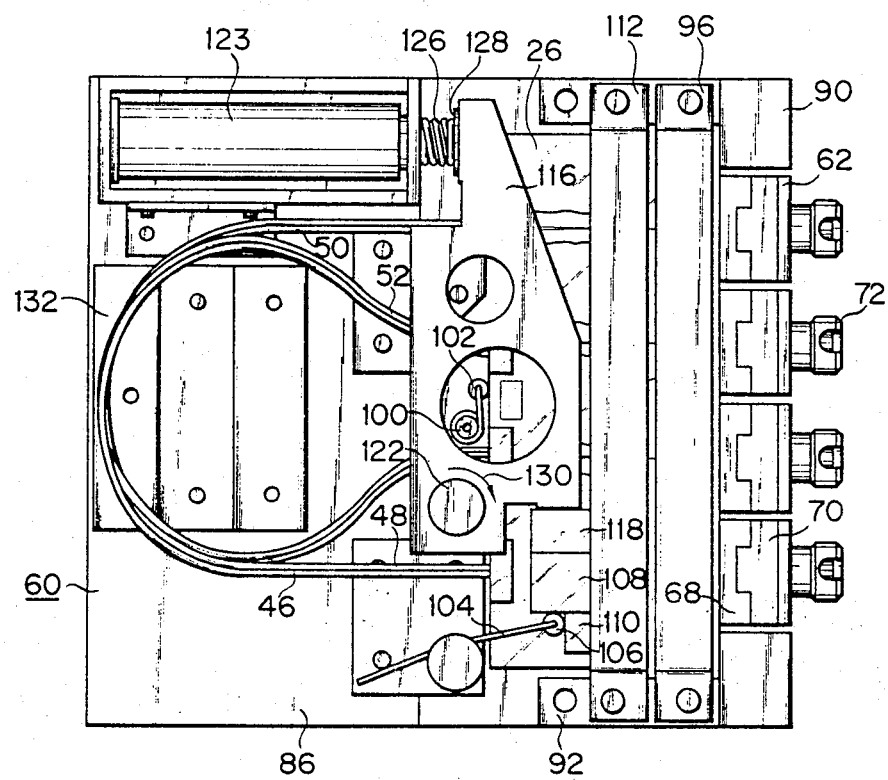
FIG. 8 is a plan view of the completed optical switching apparatus whose parts are illustrated in FIG. 6.

As illustrated in FIG. 6, the base plate 60 has four recesses 84 in its upper surface 86 which is made relatively flat. The base plate 60 further has platforms 88 on the upper surface 86. The recesses 84 are to receive those tongues 66 of the receptacle mounts 68 which are adhered to the lower surface of the stationary block 24. The platforms 88 are so machined that their upper surfaces lie in one plane. The base glass plate 10-1 of the block 24 is laid on the platforms 88. The assembly consisting of the receptacle units 62 is thereby located between two guide posts 90 which are secured to the ends of the base plate 60. The stationary block 24 is thereby disposed between two side walls 92 which extend along the lateral edges of the base plate 60. On the upper surface of the stationary block 24 a plurality of pads 94 made of elastic material such as rubber are laid. On the pads 94 a first frame plate 96 is laid. The first frame plate 96 has a through hole at either end. Two screws (not shown) are inserted through the holes of the first frame plate 96, and their lower end portions are driven into threaded holes made in the side walls 92, respectively, whereby the stationary block 24 is clamped between the first frame plate 96 on one hand and the platforms 88 on the other, as illustrated in FIG. 8.

On the upper surface 86 of the base plate 60 there are other platforms 98. These platforms 98 are so machined that their upper surfaces lie in the same plane as do the upper surfaces of the platforms 88. The movable block 26 is mounted on these platforms 98. The assembly consisting of the front halves of the glass plates 14-1 to 14-5 is thus sandwiched between the stoppers 28 and 30 extending from the stationary block 24. The optically polished face of the movable block 26 therefore comes into face-to-face relation with the optically polished face of the stationary block 24. Alternatively, the optically polished face of the movable block 26 may be put into contact with that of the stationary block 24. A formed spring 100 is mounted on the upper surface 86 of the base plate 60. One end of the spring 100 is held by a pin, and the other end of the spring 100 is attached to a roller 102. The roller 102 abuts on the unpolished face of the movable block 26. Accordingly, the spring 100 pushes the movable block 26 onto the polished face of the stationary block 24. The optically polished faces of the blocks 24 and 26 are thus kept in contact.

Another formed spring 104 is provided on the upper surface 86 of the base plate 60. The spring 104 has one end held by a pin and the other end connected to a roller 106. The roller 106 abuts on glass pieces 108 and 110, both being fixed on the movable block 26. The spring 104 therefore pushes the movable block 26 onto the inner surface of the side wall 92 which is positioned near the stopper 28. In this condition the exposed side of the front half of the glass plate 14-5 abuts on the stopper 28, and the gap 34 is provided between the stopper 30 and the exposed side of the rear half of the glass plate 14-1. Hence, the movable block 26 is placed in the first position and, as shown in FIG. 5A, the input fiber 38 is optically connected to the output fiber 42 through the coupling fiber 46 and the input fiber 40 to the output fiber 44 through the coupling fiber 50.

Above the movable block 26 there is provided a second frame plate 112. The plate 112 has a through hole in the either end portion. Two coil springs 114 are held between the plate 112 and the upper surface 86 of the base plate 60. Two screws (not shown) are inserted through the holes of the second frame plate 112, and their lower end portions are driven into threaded holes made in the side walls 92, respectively. Therefore, the movable block 26 is clamped between the second frame plate 112 on one hand and the platforms 98 on the other.

The gap 54 between the optically polished faces of the blocks 24 and 26 is filled with a nonvolatile lubricant. The lubricant has such physical properties that it optically couples the fibers 38, 40, 42 and 44 to the coupling fibers 46, 48, 50 and 52 and that the movable block 26 may smoothly slide on the optically polished face of the stationary block 24.

As shown in FIG. 6, a link 116 is disposed above the movable block 26. The link 116 has a downturned portion 120 and a pair of downturned portions 130. The link 116 is attached to a link shaft 121 which is fixed to the upper surface 86 of the base plate 60. More specifically, the link 116 is rotatably fastened to the shaft 121 by a rivet-like member 122 which is snupped into a hole made in the shaft 121. The downturned portion 120 abuts against a glass piece 118 fixed on the base glass plate half 10-1.

Above the upper surface 86 of the base plate 60 there is positioned a solenoid 123. The solenoid 123 comprises a casing and a shaft 124. The shaft 124 protrudes from the casing. On one end of the shaft 124 a disc 128 is fixed. A coil spring 126 is mounted on the shaft 124 and clamped between the solenoid casing and the disc 128. The end portion of the shaft 124 further protrudes from the disc 128 away from the solenoid casing. This protruding end portion lies between the downturned portions 130 of the link 116. As long as the solenoid 123 is energized, the shaft 124 is drawn into the solenoid casing until the spring 126 is compressed to some extent. As a result, the spring 104 therefore pushes the movable block 26 onto the stopper 28. Thus, the movable block 26 stays in the first position as long as the solenoid 123 is energized. When the power supply to the solenoid 123 is stopped, the spring 126 expands, thus causing the disc 128 to push the downturned portions 130 of the link 116. Consequently, the link 116 rotates a little in the direction of arrow. The movable block 26 is therefore pushed into the stopper 30 against the force of the spring 104 and thus is moved to the second position.

As illustrated in FIGS. 6 and 8, a fixing member 132 is secured to the solenoid casing and is thus positioned above the upper surface 86 of the base plate 60. A cover (not shown) is fastened to the fixing member 132, thereby protecting the parts of the optical switching apparatus.

As mentioned above, the optical fibers are arranged on the base glass plate 10, and then the base glass plate 10 and the glass plates 14-1 to 14-5 holding the optical fibers are cut into two pieces each, thus providing two blocks 24 and 26. It is therefore easy to arrange the optical fibers. Further, the input fibers 38 and 40 and output fibers 42 and 44, all held by the stationary block 24, are coaxially aligned with the coupling fibers 46, 48, 50 and 52, all held by the movable block 26. Accordingly, the power loss occurring in the optical switching apparatus is very small. Since the receptacles 62 which contain the optical fibers 38, 40, 42 and 44, respectively are provided on only one side, the apparatus can be more easily mounted than otherwise on a pannel of a system. Such optical connectors as shown in FIG. 7 can of course be attached to the receptacles 62 very easily. Further, the optical characteristics of the apparatus do not change very much according to the ambient temperature because the stationary block 24 and the movable block 27 are made of the same material. Still further, since both stoppers 28 and 30 are secured to the stationary block 24 (or to the movable block 26), the gap 35 between the stopper 30 and the glass plate 14-1 little varies when the ambient temperature changes even to a considerable extent. This owes to the fact that both blocks 24 and 26 are made of the same material. Moreover, since neither the stationary block 24 nor the movable block 26 is directly fixed to the base plate 60, the optical fibers will not be broken despite the blocks 24 and 26 and the base plate 60 have different coefficients of thermal expansion. For the same reason, the blocks 24 and 26 will not be deformed even if the ambient temperature varies. Furthermore, the tongues 66 of each receptacle unit 62, which clamp the stationary block 24, are made very thin, and the block 24 will therefore not be deformed despite the block 24 and the receptacle unit 62 have different coefficients of thermal expansion.

The optical switching apparatus shown in FIGS. 6 and 8 has two input optical fibers, two output optical fibers and four coupling optical fibers. The present invention is not limited to this apparatus. It may be of course be applied to other apparatus which has more or less input and output fibers and more or less coupling fibers.

What we claim is:

1. An optical switching apparatus comprising:
   a first input optical fiber having a first end face and a second end face, said first end face being so positioned as to receive an optical input signal;
   a first and a second output optical fiber each having a first end face and a second end face, the first end face of each output optical fiber being so positioned as to deliver an optical output signal;
   a stationary block holding the first input optical fiber and the first and second output optical fibers and having a face which lies flush with the second end faces of the input and output optical fibers;
   a first and a second coupling optical fiber each having a first end face and a second end face and being adapted to transmit an optical signal, the centers of said first end faces of said first and second coupling optical fibers being separated by a distance d and said first and second coupling optical fibers lying parallel to and adjacent each other near said first end faces; and
   a movable block holding the first and second coupling optical fibers, having a face which lies flush with the first and second end faces of the first and second coupling optical fibers, and being movable between a first position and a second position, said first and second positions being separated by said distance d so that the second end face of the first input optical fiber and second end face of the first output optical fiber face the first and second end faces of the first coupling optical fiber, respectively when said removable block lies in the first position and that the second end face of the first input optical fiber and the second end face of the second output optical fiber face the first and second end faces of the second coupling optical fiber, respectively when said movable block lies in the second position.

2. An optical switching apparatus according to claim 1, further comprising:
   a second input optical fiber held by said stationary block and having a first face end so positioned as to receive an optical input signal and a second end face positioned flush with said face of the stationary block; and
   a third and a fourth coupling optical fiber each having a first end face and a second end face which lie flush with said face of the movable block,
   wherein the second end face of the second input optical fiber and the second end face of the second output optical fiber face the first and second end faces of the third coupling optical fiber, respectively when said movable block lies in the first position, and the second end face of the second input optical fiber and the second end face of the first output optical fiber face the first and second end faces of the fourth coupling optical fiber, respectively when said movable block lies in the second position.

3. An optical switching apparatus comprising:
a first input optical fiber having a first end face and a second end face, said first end face being so positioned as to receive an optical input signal;
a first and a second output optical fiber each having a first end face and a second end face, the first end face of each output optical fiber being so positioned as to deliver an optical output signal;
a stationary block holding the first input optical fiber and the first and second output optical fibers and having a face which lies flush with the second end faces of the input and output optical fibers;
a first and a second coupling optical fiber each having a first end face and a second end face and being adapted to transmit an optical signal, the centers of said first end faces of said first and second coupling optical fibers being separated by a distance d and said first and second coupling optical fibers lying parallel to and adjacent each other near said first end faces;
a movable block holding the first and second coupling optical fibers, having a face which lies flush with the first and second end faces of the first and second coupling optical fibers, and being movable between a first position and a second position, said first and second positions being separated by said distance d so that the second end face of the first input optical fiber and second end face of the first output optical fiber face the first and second end faces of the first coupling optical fiber, respectively when said movable block lies in the first position and that the second end face of the first input optical fiber and the second end face of the second output optical fiber face the first and second end faces of the second coupling optical fiber, respectively when said movable block lies in the second position; and
means for pressing said movable block against said stationary block so that said face of said movable block and said face of said stationary block are in slidable intimate contact.

4. An optical switching apparatus according to claim 3, further comprising stoppers for limiting the movement of said movable block and defining the first and second positions thereof.

5. An optical switching apparatus according to claim 3, further comprising means for moving said movable block.

6. An optical switching apparatus according to claim 3, wherein said face of the movable block is put in contact with said face of the stationary block.

7. An optical switching apparatus according to claim 6, further comprising a lubricant filling the gap between said movable block and said stationary block.

8. An optical switching apparatus according to claim 3, further comprising receptacles holding said input and output optical fibers, respectively, secured to said stationary block and adapted to be coupled to connectors.

9. An optical switching apparatus comprising:
a first input optical fiber having a first end face and a second end face, said first end face being so positioned as to receive an optical input signal;
a first and a second output optical fiber each having a first end face and a second end face, the first end face of each output optical fiber being so positioned as to deliver an optical output signal;
a stationary block holding the first input optical fiber and the first and second output optical fibers and having a face which lies flush with the second end faces of the input and output optical fibers;
a first and a second coupling optical fiber each having a first end face and a second end face and being adapted to transmit an optical signal, the centers of said first end faces of said first and second coupling optical fibers being separated by a distance d and said first and second coupling optical fibers lying parallel to and adjacent each other near said first end faces;
a movable block holding the first and second coupling optical fibers, having a face which lies flush with the first and second end faces of the first and second coupling optical fibers, and being movable between a first position and a second position, said first and second positions being separated by said distance d so that the second end face of the first input optical fiber and second end face of the first output optical fiber face the first and second end faces of the first coupling optical fiber, respectively when said movable block lies in the first position and that the second end face of the first input optical fiber and the second end face of the second output optical fiber face the first and second end faces of the second coupling optical fiber, respectively when said movable block lies in the second position;
a second input optical fiber held by said stationary block and having a first end face so positioned as to receive an optical input signal and a second end face positioned flush with said face of the stationary block;
a third and a fourth coupling optical fiber each having a first end face and a second end face which lie flush with said face of the movable block,
wherein the second end face of the second input optical fiber and the second end face of the second output optical fiber face the first and second end faces of the third coupling optical fiber, respectively when said movable block lies in the first position, and the second end face of the second input optical fiber and the second end face of the first output optical fiber face the first and second end faces of the fourth coupling optical fiber, respectively when said movable block lies in the second position; and
means for pressing said movable block against said stationary block so that said face of said movable block and said face of said stationary block are in slidable intimate contact.

10. An optical switching apparatus according to claim 9, wherein said first and second output optical fibers are so positioned that the distance between the second end faces is equal to the distance between the second end faces of the first and second input optical fibers.

11. An optical switching apparatus according to claim 9, wherein said first and second coupling optical fibers have end portions which are near their respective first end faces and which lie close to each other, said third and fourth coupling optical fibers have end portions which are near to their respective first end faces and which lie close to each other, said second and third coupling optical fibers have end portions which are near their respective second end faces and which lie close to each other, and said first and fourth coupling optical fibers have end portions which are near to their respective second end faces and which lie close to each other.

* * * * *